United States Patent [19]
Ghisler

[11] 3,974,340
[45] Aug. 10, 1976

[54] DATA SWITCHING APPARATUS AND METHOD
[75] Inventor: Walter Ghisler, North Balwyn, Australia
[73] Assignee: L.M. Ericsson Pty Ltd., Australia
[22] Filed: Mar. 19, 1974
[21] Appl. No.: 452,674

[30] Foreign Application Priority Data
Mar. 19, 1973 Australia............................ 2632/73

[52] U.S. Cl.......................... 179/15 AT; 179/15 AQ
[51] Int. Cl.² ........................................... H04J 3/00
[58] Field of Search....... 179/18 GF, 18 GE, 18 EA, 179/15 AT, 15 AQ; 340/166 R, 18 GE, 18 GF, 18 EA, 15 AT, 15 AQ

[56] References Cited
UNITED STATES PATENTS

| 3,629,512 | 12/1971 | Yuan............................. | 179/18 GE |
| 3,660,600 | 5/1972 | Lee............................... | 179/18 EA |
| 3,729,591 | 4/1973 | Gueldenpfennig............. | 179/18 GE |
| 3,745,259 | 7/1973 | Romero et al................. | 179/18 GE |
| 3,851,105 | 11/1974 | Regnier et al................. | 179/15 AT |

Primary Examiner—William C. Cooper
Assistant Examiner—Joseph Popek
Attorney, Agent, or Firm—Cushman, Darby & Cushman

[57] ABSTRACT

A method and apparatus for switching PCM data in a telephone exchange wherein the switch is of the time-space-time (TST) type comprising a plurality of identical inter-connected groups, each group having two separate planes in which connections may be established. A plane select bit of data is added to each speech sample before switching through the space switching stage. The plane select bit influences a logic circuit at the switch output to determine which plane provides the outgoing data. For reliability connections are duplicated, that is, made in both planes until congestion occurs and when congestion occurs a new call is made in a path of one of the planes previously used for duplication. Information relevant to unduplicated connections is stored in a memory external to the switch to enable unduplicated connections to be reestablished if they should be lost due to a fault. The switch has the advantage of being congestionless without necessitating a large external memory for storing information relevant to unduplicated connections.

11 Claims, 1 Drawing Figure

U.S. Patent  Aug. 10, 1976  3,974,340
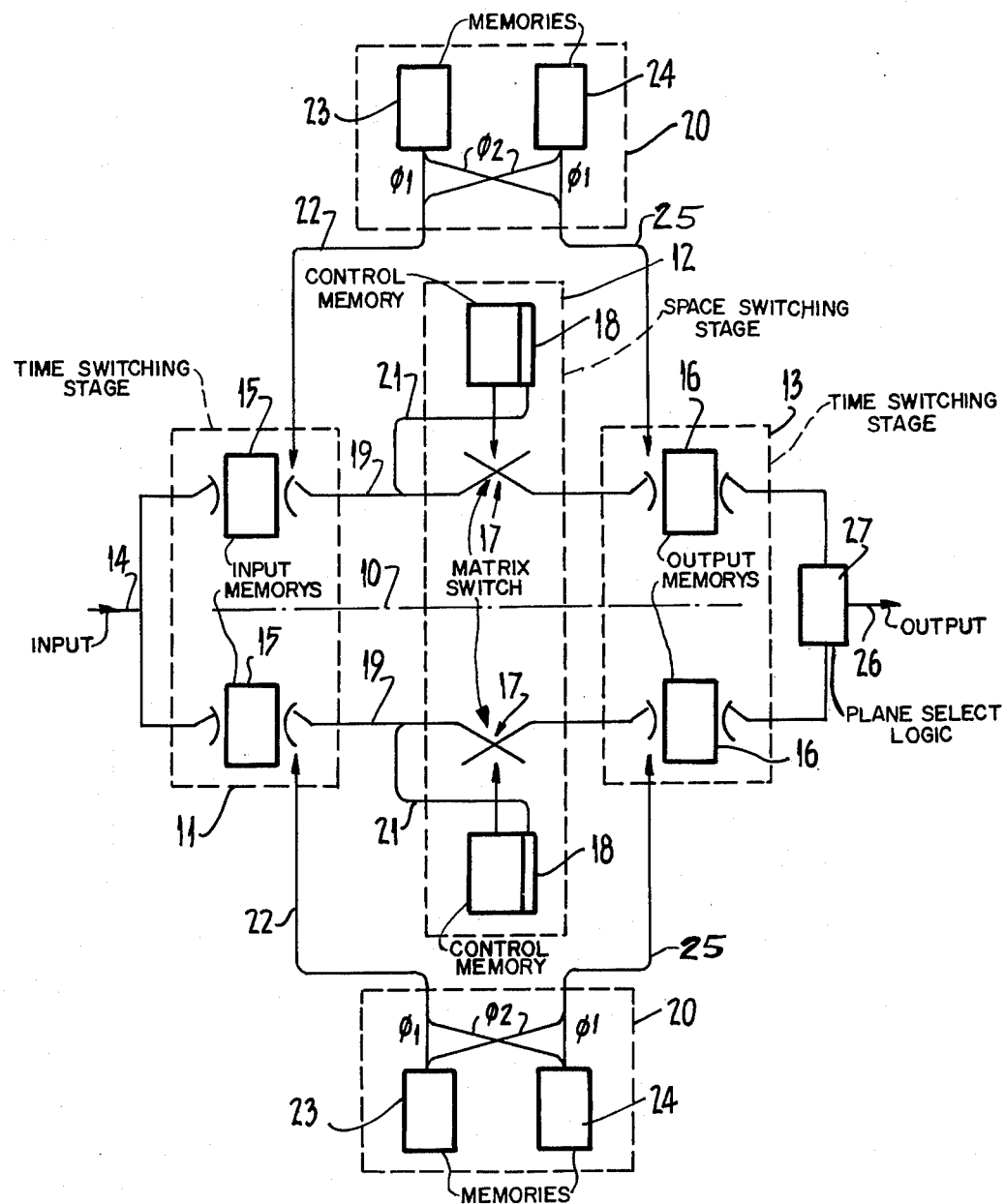

DATA SWITCHING APPARATUS AND METHOD

This invention relates to telephone or data systems and more particularly to an improved method and apparatus for switching digital data in a telephone or data system.

Digital switches of the kind contemplated are generally known and descriptions thereof may be found in U.S. Pat. Nos. 3,660,600, 3,629,512, 3,729,591 and 3,745,259, all of which relate to path selection through such switches.

Throughout the description and claims the term 'plane' refers to the subdivision of a digital switch into identical parts (planes) each being capable of performing the whole switching function except for higher congestion.

In larger systems it is known to protect data by providing two separate hardware data planes through the switch and making each connection in both planes such that when an error occurs in the plane being used the erroneous hardware is blocked and the corresponding hardware of the other plane is enabled. Such a system has the advantages of a relatively low cost, high reliability and fast operation but suffers the disadvantage that the traffic capability is limited because congestion is increased due to duplication of the calls.

A further known system uses both planes for setting up unduplicated connections thereby achieving low or zero congestion. Information on each connection is contained once in the switch connection in the planes and is duplicated in a memory in the external control. When an error occurs the affected connections are re-established using the information in the memory. Any congestion in re-establishing connections is low but a disadvantage resides in the fact that the time required to transfer the connections is high compared to the first mentioned system and also that a larger data store is required which makes the cost of the system relatively high.

Furthermore, in a multiplane system it is necessary to have some means at the switch output to select one or the other plane. This has been achieved simply by providing an inclusive OR function for the data at the switch output, but a disadvantage resides in the fact that the plane not in use is still effectively connected to the switch output and any noise, for example, on the non-used plane is combined with the data. An obvious way to avoid this disadvantage is to supply for each connection, some control bits from the external control to a logic circuit at the switch output to positively connect the active plane to the output and positively disconnect the inactive plane. However, in larger systems as contemplated here to provide control bits on a per connection basis would be undesirable because of the amount of work required by the external control in the event of a fault.

It is the object of this invention to provide an improved switching method and apparatus which obviates one or more of the abovementioned disadvantages.

Accordingly, the invention provides a method of switching digital data in a telephone or data system, which system includes a switch having a plurality of similar interconnected groups each having two planes for said data, said method including using said planes for duplicated connections whereby the connection is made in both planes and/or unduplicated connections whereby the connection is made in only one plane, switching a plane select bit with each speech sample being switched through the switch in at least one of said planes, said plane select bit influencing a logical circuit at the switch output to select which plane provides each speech sample output.

According to a further aspect the invention provides an apparatus for switching digital data in a telephone or data system, which system includes a switch having a plurality of similar interconnected groups each having two planes for said data, said apparatus including means for setting up duplicated connections through the switch whereby the connections are made in both planes and/or setting up unduplicated connections through the switch whereby the connections are made in only one plane, means for providing a plane select bit for switching through the switch with each speech sample in at least one of said planes, and a logical circuit at the switch output to receive each plane select bit and be influenced by said plane select bit in selecting which plane provides such speech sample output.

In order that the invention may be more readily understood one particular embodiment will now be described with reference to the accompanying drawing. The embodiment relates to a digital switch for PCM speech data and suitable for use in a digital telephone exchange. The drawing is a schematic block diagram of one group or section of the switch which comprises, in all, 32 similar groups.

The group shown in the drawing is divided into two identical planes being indicated above and below the broken line 10. Like reference numerals will be used to designate identical integers of the two planes.

The switch is of the TST type, that is, there are three stages of switching, the first stage 11 being time switching, the second stage 12 being space switching enabling a connection to be made to another group of the switch and the third stage 13 being time switching.

Incoming speech samples, in the form of parallel 8 bit PCM data enter the switch on connection 14 and are written sequentially into incoming speech memories 15 in each plane (only one direction of transmission considered). Each memory 15 is a 512 x 9 bit RAM (8 bit word, 1 bit parity) and there are enough memory cells or locations in the memories to provide duplicated set up for all calls. In other words, with 512 incoming channels to the group there is a dedicated location in each memory 15, for each incoming channel. Similarly, an outgoing speech memory 16 in each plane is a 512 word RAM which provides a dedicated location for each outgoing channel of the group.

The space switching stage 12 comprises a matrix switch 17 and a control memory 18 in each plane. The control memory 18 provides the address to the matrix switch 17. The matrix switch 17 comprises 10 32 input multiplexers (not shown) that is, each multiplexer has an input from the output 19 of one speech memory 15 of each of the 32 groups constituting the switch and there are ten multiplexers because the output 19 from the memory 15 is 9 bits of parallel data (8 bits plus parity) and a further bit is added on connection 21 as described below. It can be shown then that the space switching stage 12 is not congestionless if some calls are duplicated and it is in this respect that the present invention is utilized, as will become apparent hereinbelow. Firstly however, the remainder of the integers forming the group will be described.

As mentioned above incoming data is written sequentially into the memories 15. Data is read from the memories 15 under the control of control memories 20 and connection 22. The memories 20 also control the writing of data into the outgoing speech memories 16. The control memory 20 comprises two 256 word RAM's 23 and 24 which supply the appropriate addresses to the memories 15 and 16.

Each of the RAM's 23 and 24 has ten bits per word, nine bits being the address necessary for the memories 15 and 16 and one bit being a parity bit. A counter (not shown) provides nine bit addresses to the RAM's 23 and 24 and during the count 0 – 255 the output of the respective RAM's is transmitted on connections $\phi_1$ whereas alteration of the most significant bit of the address from the counter causes the address from the RAM's to go via connection $\phi_2$, that is, during the count 256 – 511 $\phi_2$ has the RAM output. Consequently for an inter-group connection only one of the two RAM's of each control memory 20 of each group is used for the connection, the RAM in use providing for instance the A party address to the speech memory 15 via connection 22 during one half of the frametime and to the speech memory 16 via connection 25 during the other half of the frame time. For an intra-group connection the A party address is contained in one location of the two RAM's 23 and 24 and the B party address is contained in the corresponding location of the other RAM.

As described above the space switching stage 12 includes a control memory 18 for each matrix switch 17. The memory 18 is a 512 × 9 bit RAM, 5 bits being the address of the 32 input multiplexers, 2 extra bits being spare bits enabling expansion of the switch to 128 groups, one bit being a parity bit, and one bit being a plane select bit which is transmitted on connection 21 to join with the data on connection 19.

Initially each connection of the group is duplicated, that is, the connection is made in both planes and it is therefore necessary to decide, at some point which plane will provide the speech data to be transmitted from the switch group on output connection 26. This is achieved by the plane select bits from the memories 18 in association with a logic unit 27. The plane select bit is written into the memory 18 of each plane by external control and the following truth table shows one suitable arrangement of plane select bits and the plane which will provide the outgoing data. For convenience one plane is designated 'plane 1' and the other 'plane 2'.

|  | Duplicated Calls | Unduplicated calls in Plane 2 | Unduplicated calls in Plane 1 | Normally not used |
|---|---|---|---|---|
| Plane sel. bit of Plane 1 | 0 | 0 | 1 | 1 |
| Plane Sel. bit of Plane 2 | 0 | 1 | 0 | 1 |
| Plane providing output | No. 1 | No. 2 | No. 1 | No. 1 |

The logic unit 27 detects the above combinations of the plane select bits and for each outgoing channel gates through the speech data of the plane to be used.

As mentioned above the space switch 12 is not congestionless for duplication of connections but it is congestionless if connections are always set up in one plane only. Therefore, each connection or call through the group is duplicated in the two planes until congestion occurs. When congestion occurs it is elminated by a central control (not shown) which cancels the duplication of one of the calls in progress allowing use of the path through one of the planes for setting up the new call in unduplicated form. Both the new call and the affected call are recorded in a memory in the central control to enable both calls to be reconnected if for some reason they become disconnected, for example, due to a hardware fault somewhere within the group. If a hardware fault occurs, for example, in one location of the incoming speech memories 15 of plane 1, the central control issues a command changing all plane select bits of plane 2 of the group in question thereby causing the logic circuit 27 to choose all speech data of duplicated calls in that group from plane 2. Unduplicated calls are still selected from their respective planes. The central control then transfers any unduplicated calls from the faulty plane 1 by using the records in the central control memory to set up the connections in plane 2 and cancelling the corresponding path in plane 1. Obviously this process is time consuming since it must be done call by call but fortunately the number of calls to be treated in this way will be low.

When doing the switch over in case of a fault in speech path or a fault in the plane select bits themselves, the control is applied for each plane of each group in a way overiding the plane select bits of memory 18.

The use of plane select bits as described above results in higher reliability of the system, by making it possible to switch one individual group with all associated duplicated connections in progress from one plane to the other rather than effecting a switch over for all groups in the system.

Another advantage of said plane select bits is a faster recovery from a fault because they enable few control operations to switch over many duplicated connections, rather than needing control operations on each of said connections.

As an alternative to the above described embodiment the plane select bits are only included with the speech samples in one or the other plane and thus one logical state is assigned to select one plane and the other logical state the other plane.

It should be apparent from the above described embodiment that the invention provides considerable advantages over the prior art.

For example, it removes the congestion inherent in the first mentioned prior art system and avoids the slow operation of the other prior art system since only very few calls are subjected to the call by call switch over. Furthermore, the method and apparatus of this invention is relatively low in cost since it does not require a large data store in the memory of the central control.

It should also be apparent that the invention is not limited to the switching of PCM data since other forms of digital data may be switched.

I claim:

1. A method of switching digital data in a telephone or data system, which system includes a switch having a plurality of similar interconnected groups each having two planes for said data, said method including using said planes for duplicated connections between any inlet and outlet of said switch whereby the connection is made in both planes and/or unduplicated connections between any inlet and outlet of said switch whereby the connection is made in only one plane, inserting a plane select bit with each speech sample being switched through the switch in at least one of said planes, said plane select bit causing a logical circuit at the switch output to select which plane provides each speech sample output, wherein each connection through the switch is duplicated until congestion occurs and when congestion occurs said method including the step of using an external control to cause a new connection to be set up in a path previously used for duplication so as to remove the congestion, said new connection and one of the previously duplicated connections then being unduplicated in said switch.

2. A method as defined in claim 1 further including storing digital information relevant to the particular path of any unduplicated connections in a memory external of the switch to enable re-establishment of said unduplicated connections if a fault causes loss of the connection.

3. A method as defined in claim 2 wherein said switch has a space switching stage for effecting inter-group connections and said plane select bit is combined with said speech sample in said switch before switching through said space switching stage.

4. An apparatus for switching digital data in a telephone or data system, which system includes a switch having a plurality of similar inter-connected groups each having two planes for said data, said apparatus including means for setting up duplicated connections between any inlet and outlet of said switch through the switch whereby the connections are made in both planes and/or setting up unduplicated connections between any inlet and outlet of said switch through the switch whereby the connections are made in only one plane, means for providing a plane select bit for switching through the switch with each speech sample in at least one of said planes, and a logical circuit at the switch output to receive each plane select bit and to be caused by said plane select bit to select which plane provides each speech sample output, said means for setting up said duplicated and/or unduplicated connections includes a control external of said switch, said control causing duplication of each connection through the switch until congestion occurs and when congestion occurs said control causing a new connection to be set up in a path previously used for duplication so as to remove the congestion, said new connection and one of the previous connections then being unduplicated in said switch.

5. An apparatus as defined in claim 4 wherein said control includes a memory for storing digital information relevant to the particular path of any unduplicated connection to enable re-establishment of said unduplicated connections if a fault causes loss of connection.

6. An apparatus as defined in claim 5 wherein said switch has a space switching stage for effecting inter-group connections, said plane select bit being combined with said speech sample in said switch before switching through said space switching stage.

7. An apparatus as defined in claim 6 wherein said switch has three stages of switching and is of the time-space-time (TST) type, the first stage being a time switching stage and including an incoming speech memory in each plane, each incoming speech memory having sufficient capacity to simultaneously store data for all incoming channels to the switch, the second stage being said space switching stage enabling connections to any one of said plurality of groups, said space switching stage not having sufficient capacity to handle all connections for duplicated connections through said switch and the third stage being a time switching stage including an outgoing speech memory in each plane, each outgoing speech memory having sufficient capacity to simultaneously store data to all outgoing channels of the switch, said switch having an inlet and outlet from each data source enabling duplex connections through said switch.

8. An apparatus as defined in claim 7 including a control memory for each plane to provide addresses to the incoming and outgoing speech memories of the respective planes, for controlled reading from and writing into the speech memories, respectively, said control memory comprising a pair of RAM's each having an address storage capability equal to half the maximum number of connections which can be made through the switch, each RAM being adapted to provide an address to the incoming and outgoing speech memory during respective halves of a cycle of the speech memories and each RAM addressing a different one of said speech memories at any one time.

9. An apparatus as defined in claim 8 wherein each said speech memory is a RAM, said apparatus including a further control memory in the form of a RAM in each plane for providing digital addresses to the space switching stage of the respective planes.

10. An apparatus as defined in claim 9 wherein said digital data is PCM data and said space switching stage includes a plurality of multiplexers in each plane, the number of multiplexers being equal to the number of bits of each PCM word plus a parity and plane select bit, each multiplexer having an input from one incoming speech memory of each group of the switch, the output of each multiplexer being connected to the outgoing speech memory of the plane.

11. An apparatus as defined in claim 10 wherein said switch has 32 groups, 512 inlets and outlets being connected to each group.

\* \* \* \* \*